United States Patent [19]

Mickelson et al.

[11] Patent Number: 4,610,087

[45] Date of Patent: Sep. 9, 1986

[54] EATING UTENSIL FOR CORRECTIONAL INSTITUTIONS

[75] Inventors: Jim Mickelson; Barbara L. Winfield, both of Santa Fe, N. Mex.

[73] Assignee: State of New Mexico, N. Mex.

[21] Appl. No.: 685,446

[22] Filed: Dec. 24, 1984

[51] Int. Cl.[4] .............................................. A47J 43/28

[52] U.S. Cl. ........................................ 30/147; 30/322; 30/324

[58] Field of Search .......................... 30/142, 147-150, 30/322-328, 47; D7/137, 138, 151-152; 16/110 R, 111 R, 114 R, DIG. 19; 403/2

[56] References Cited

U.S. PATENT DOCUMENTS

D. 196,110 8/1963 Holbek ............................... D7/137

D. 252,181 6/1979 Sebring ............................... D7/137

2,185,942 1/1940 Frank .................................. 30/147

2,296,404 9/1942 Ressegger ......................... 30/324 X

*Primary Examiner*—James M. Meister

*Assistant Examiner*—John L. Knoble

*Attorney, Agent, or Firm*—William A. Eklund

[57] ABSTRACT

An eating utensil, such as a fork, spoon or dinner knife, for use in correctional institutions. The utensil is formed of a polymeric plastics material and includes a handle which is constructed so as to prevent the utensil from being formed into a sharpened weapon by grinding or other alteration. In the preferred embodiment the handle includes a shallow recess on the bottom side, and a plurality of diagonal slots on the top side, which effectively prevent any portion of the handle from being fashioned into a sharpened instrument of sufficient length to constitute a dangerous weapon.

16 Claims, 8 Drawing Figures

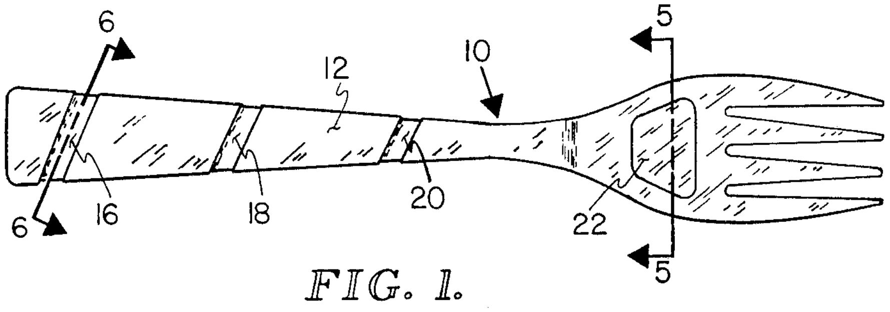
FIG. 1.
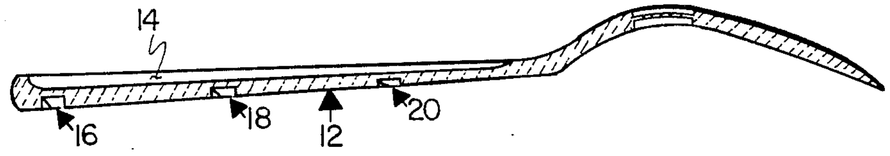
FIG. 2.
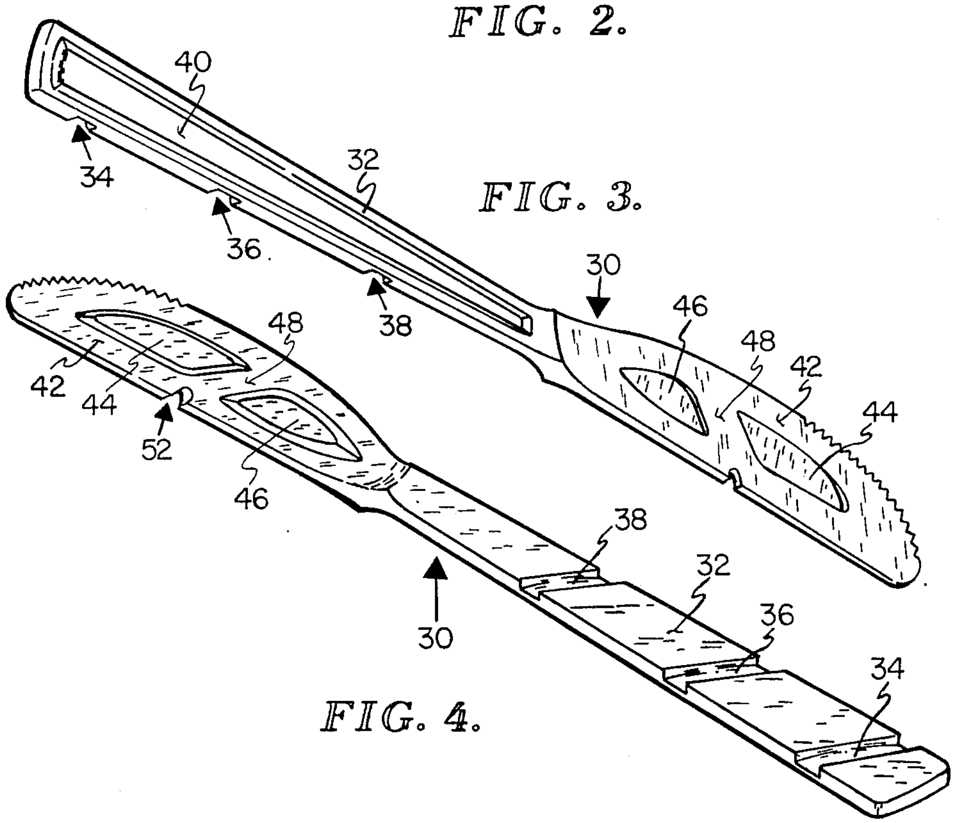
FIG. 3.
FIG. 4.

EATING UTENSIL FOR CORRECTIONAL INSTITUTIONS

BACKGROUND OF THE INVENTION

The present invention is generally related to eating utensils such as spoons, forks and dinner knives.

The alteration of eating utensils to form sharpened weapons is a well-known problem in correctional institutions. Forks, dinner knives and spoons are easily transformed into sharp weapons, commonly called shivs, by grinding them against a concrete surface. Even plastics utensils can be fashioned into dangerous weapons in this manner. Although it is sometimes sought to address this problem by preventing the theft of utensils, in practice this proves difficult if not impossible.

Accordingly, it is the object and purpose of the present invention to provide an eating utensil which cannot be used as a weapon or fashioned into a weapon, yet which is nevertheless useful and durable for its ordinary purpose as an eating utensil.

SUMMARY OF THE INVENTION

In accordance with the present invention, there is provided a durable plastics eating utensil having a handle which is provided with a plurality of transverse slots. The slots arespaced apart along the handle by distance which are sufficiently short to prevent any part of the handle from formed into a sharpened object of sufficient length to constitute a dangerous weapon.

In the preferred embodiment the slots extend diagonally with respect to the axis of the handle and are all located on the same side of the handle. On the opposite side of the handle is formed a shallow concave recession which extends the major length of the handle. The bottom surfaces of the slots are convexly curved so as to conform with the underlying surface of the concave recession. Such a structure results in optimum strength while also providing minimum opportunity for fashioning the utensil into a weapon.

These and other aspects of the present invention will be readily apparent from consideration of the accompanying drawings and the following detailed description of certain preferred embodiments of the invention.

BRIEF DESCRIPTION OF THE DRAWINGS

The accompanying drawings are incorporated into and form a part of the specification. In the drawings:

FIG. 1 is a plan view of a fork constructed in accordance with the present invention;

FIG. 2 is a side view in cross section fo the fork shown in FIG. 1;

FIG. 3 is an isometric bottom view of a dinner knife constructed in accordance with the present invention;

FIG. 4 is an isometric top view of the dinner knife shown in FIG. 3;

DETAILED DESCRIPTION OF THE INVENTION

The present invention may be incorporated in any of the common eating utensils, particularly including forks, dinner knives, teaspoons, soup spoons, and others. The accompanying drawings illustrate preferred embodiments of the invention as incorporated in three common utensils, namely a fork, a dinner knife and a soup spoon.

Figure 5:
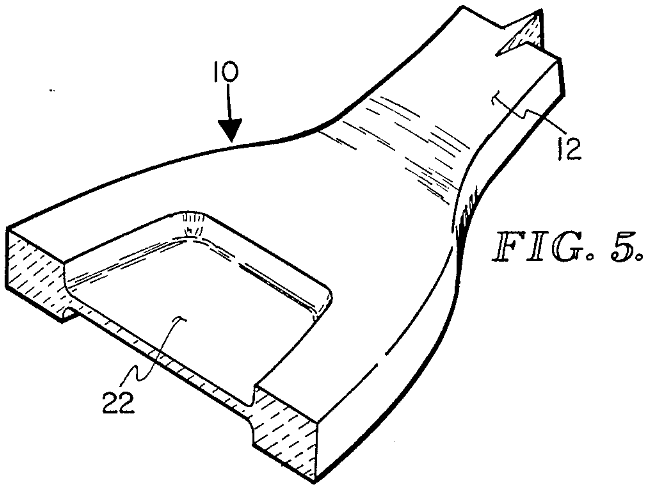
FIG. 5 is an enlarged view in cross section of a portion of the fork shown in FIG. 1, taken along section line 5—5 of FIG. 1.
Figure 6:
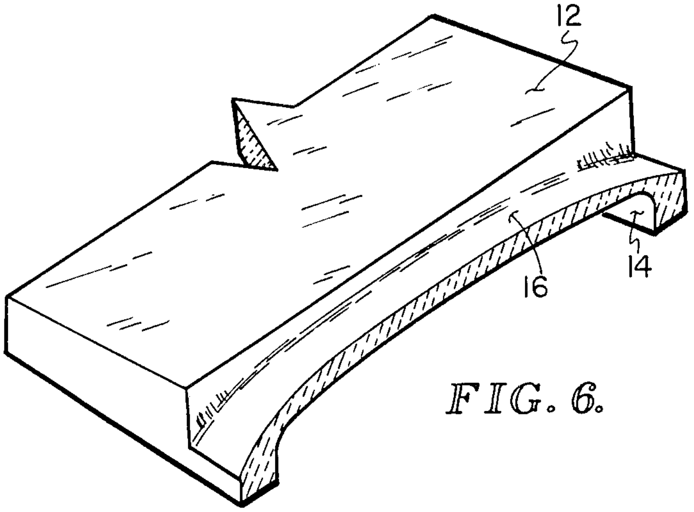
FIG. 6 is an enlarged view in partial cross section of a portion of the handle of the knife shown in FIGS. 3 and 4, taken along section line 6—6 of FIG. 1.

Referring first to FIGS. 1, 2, 5 and 6, there is illustrated a preferred embodiment of a plastic dinner fork 10 constructed in accordance with the present invention. The fork includes a handle 12. On the underside of the handle 12 there is formed a shallow concave recess 14 which extends the major length of the handle. On the upper side of the handle there are formed three slots 16, 18 and 20, which extend across the top of the handle diagonally with respect to the longitudinal axis of the handle. The slots are rectangular in cross section; however, the bottom surface of each slot is convexly curved so as to conform with and accommodate the underlying concave surface of the recess 14, as best shown in FIG. 6. Thus, the depth of each slot is greatest at the sides of the handle, where the slot extends to a depth of approximately three-fourths of the thickness of the handle, and the depth is the least at the center of the handle, as shown in FIG. 6. This structure effectively prevents the handle from being fabricated into a weapon any longer than the distance between the adjacent slots, which distance is not sufficiently long to permit the fabrication of a dangerous weapon, yet provides the handle with sufficient structural strength to withstand ordinary use.

The fork 10 further includes an integral 0.020-inch thick web 22 formed in the bowl of the fork, between the tang and the prongs of the fork, as shown best in FIG. 5. The web 22 further reduces the amount of material available for fashioning into a weapon, without significantly diminishing the structural strength the fork. In an alternative embodiment, the web 22 may be omitted in favor of an opening of similar size and shape in the bowl of the fork.

FIGS. 3 and 4 illustrate a dinner knife 30 constructed in accordance with the present invention. As with the fork described above, the dinner knife includes a handle 32 having three slots 34, 36 and 38 formed on one side thereof. On the opposite side of the handle there is formed a shallow concave recess 40. Each of the slots 34, 36 and 38 has a convexly curved bottom surface which conforms with the curvature of the recess 40. In this regard, the structure of the dinner knife handle and its associated slots is substantially identical to that of the fork handle shown in FIG. 6.

The dinner knife 30 includes a blade 44 which has two thin webs 44 and 46, which are separated by an integral reinforcing rib 48. Each web is approximately 0.020 inch thick. The webs function to prevent the blade of the knife from being fashioned into a weapon, without impairing the ordinary function of the knife. The unsharpened, or back, edge of the blade 42 also includes a notch 52 which is centered on the rib 50 and which serves to effectively weaken the back edge of the blade so as to prevent it from being fashioned into a dangerous weapon.

In an alternative embodiment the webs 44 and 46 may be omitted in favor of simple openings of similar size and shape.

Figure 7:
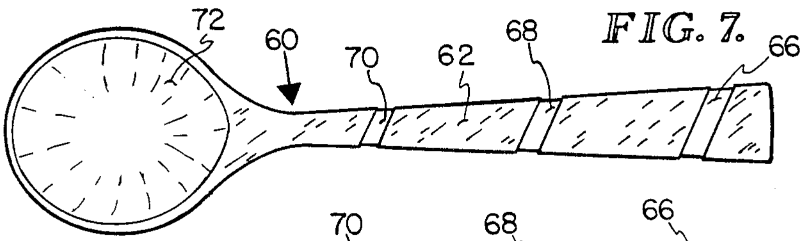
FIG. 7 is a plan view of a soup spoon constructed in accordance with the present invention.
Figure 8:
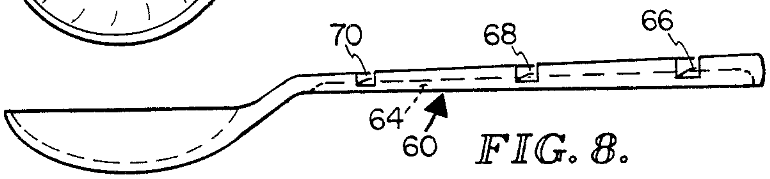
FIG. 8 is a side view of the soup spoon shown in FIG. 8.

FIGS. 7 and 8 illustrate a preferred embodiment of a soup spoon 60 constructed in accordance with the present invention. As with the utensils described above, the spoon 60 includes a handle 62 having a shallow concave recess on the bottom side, and a set of three diagonal slots 66, 68 and 70 formed on the top side. The slots and the recess are substantially identical to those described above with regard to the fork 10 and dinner knife 30. The bowl 72 of the spoon is not provided with webs, as in the fork and dinner knife described above, as the bowl can be constructed sufficiently thin, and in the illustrated concave shape, so as to ensure against its use to fabricate a weapon, while also being sufficiently strong to withstand ordinary use.

The utensils described above may be constructed from various suitable polymeric materials, particularly the high and low impact polystyrenes, and also including the vinyl plastics, polycarbonates, nylons and acrylonitrile butadiene styrene (ABS). The utensils may be made by conventional plastics manufacturing techniques, for example by injection molding.

The three utensils described above and illustrated in the drawings are related as specific embodiments of the present invention, which is considered to encompass these as well as other common eating utensils. Although the present invention is described and illustrated herein by reference to three preferred embodiments of individual species of the invention, it will be understood that various modifications, substitutions and alterations may be made without departing from the spirit of the invention. Accordingly, the present invention is defined by the following claims.

What is claimed is:

1. An eating utensil, such as a fork, spoon or dinner knife, comprising an elongate handle formed of a polymeric material, said handle having a longitudinal axis, and wherein said handle includes a plurality of slots formed therein transverse to said axis so as to prevent said handle of said utensil from being fashioned into a sharp weapon, said slots being of a depth sufficient to render said handle so weak as to effectively preclude it from being sharpened and used as a weapon, and said slots yet being sufficiently shallow that said handle is of sufficient strength for its ordinary purpose.

2. The eating utensil defined in claim 1 wherein said handle includes opposite sides, said slots being formed on one side of said handle, and wherein said handle further comprises a shallow concave recess formed on the side of said handle opposite said slots and which extends the major length of said handle.

3. The eating utensil defined in claim 2 wherein said slots have bottom surfaces which are convexly curved so as to conform with the surface of said shallow concave recess on the opposite side of the handle.

4. The eating utensil defined in claim 3 wherein said slots extend diagonally with respect to said axis of said handle.

5. A fork comprising an elongate handle formed of a polymeric material, said handle having a longitudinal axis, and wherein sand handle includes a plurality of slots formed therein transverse to said axis so as to prevent the handle of the fork from being fashioned into a sharp weapon, said slots being of a depth sufficient to render said handle so weak as to effectively preclude it from being sharpened and used as a weapon, and said slots yet being sufficiently shallow that said handle is of sufficient strength for its ordinary purpose.

6. The fork defined in claim 5 wherein said handle includes opposite sides, said slots being formed on one side of said handle, and wherein said handle further comprises a shallow concave recess formed on the side of said handle opposite said slots and which extends the major length of said handle.

7. The fork defined in claim 6 wherein said slots have bottom surfaces which are convexly curved so as to conform with the surface of said shallow concave recess on the opposite side of the handle.

8. The fork defined in claim 7 wherein said slots extend diagonally with respect to said axis of said handle.

9. The fork defined in claim 5, said fork including prongs and a bowl, and wherein said fork further comprises a thin web formed in said bowl between said handle and said prongs of said fork.

10. The fork defined in claim 5, said fork including prongs and a bowl, and wherein said fork further comprises at least one opening formed in said bowl of said fork between said handle and said prongs of said fork.

11. A dinner knife comprising a blade and elongate handle formed of a polymeric material, said handle having a longitudinal axis, and wherein said handle includes a plurality of transverse slots formed therein so as to prevent the handle of the dinner knife from being fashioned into a sharp weapon, said slots being of a depth sufficient to render said handle so weak as to effectively preclude it from being sharpened and used as a weapon, and said slots yet being sufficiently shallow that said handle is of sufficient strength for its ordinary use.

12. The dinner knife defined in claim 11 wherein said handle includes opposite sides, said slots being formed on one side of said handle, and wherein said handle further comprises a shallow concave recess formed on the side of said handle opposite said slots and which extends the major length of said handle.

13. The dinner knife defined in claim 12 wherein said slots have bottom surfaces which are convexly curved so as to conform with the surface of said shallow concave recess on the opposite side of the handle.

14. The dinner knife defined in claim 13 wherein said slots extend diagonally with respect to said axis of said handle.

15. The dinner knife defined in claim 11, wherein said blade includes at least one web formed in said blade so as to prevent said blade from being useful as a weapon.

16. The dinner knife defined in claim 11, wherein said blade includes at least one opening formed therein so as to prevent said blade from being useful as a weapon.

* * * * *